Feb. 17, 1970    R. SWEET    3,495,517
AIRBORNE VIEWFINDER MEANS WITH FIBER OPTICS
Filed July 31, 1967    2 Sheets-Sheet 1
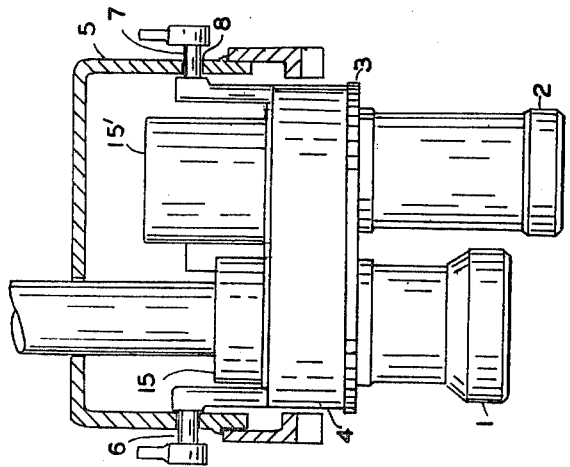
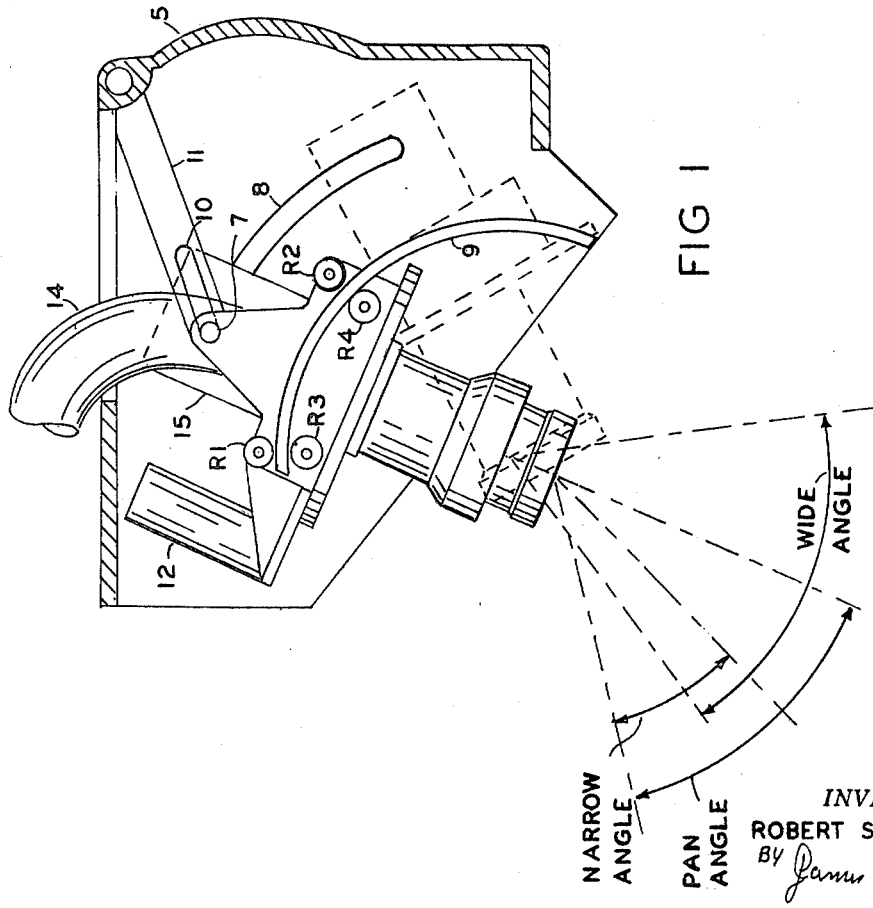
INVENTOR.
ROBERT SWEET
BY James P. Malone

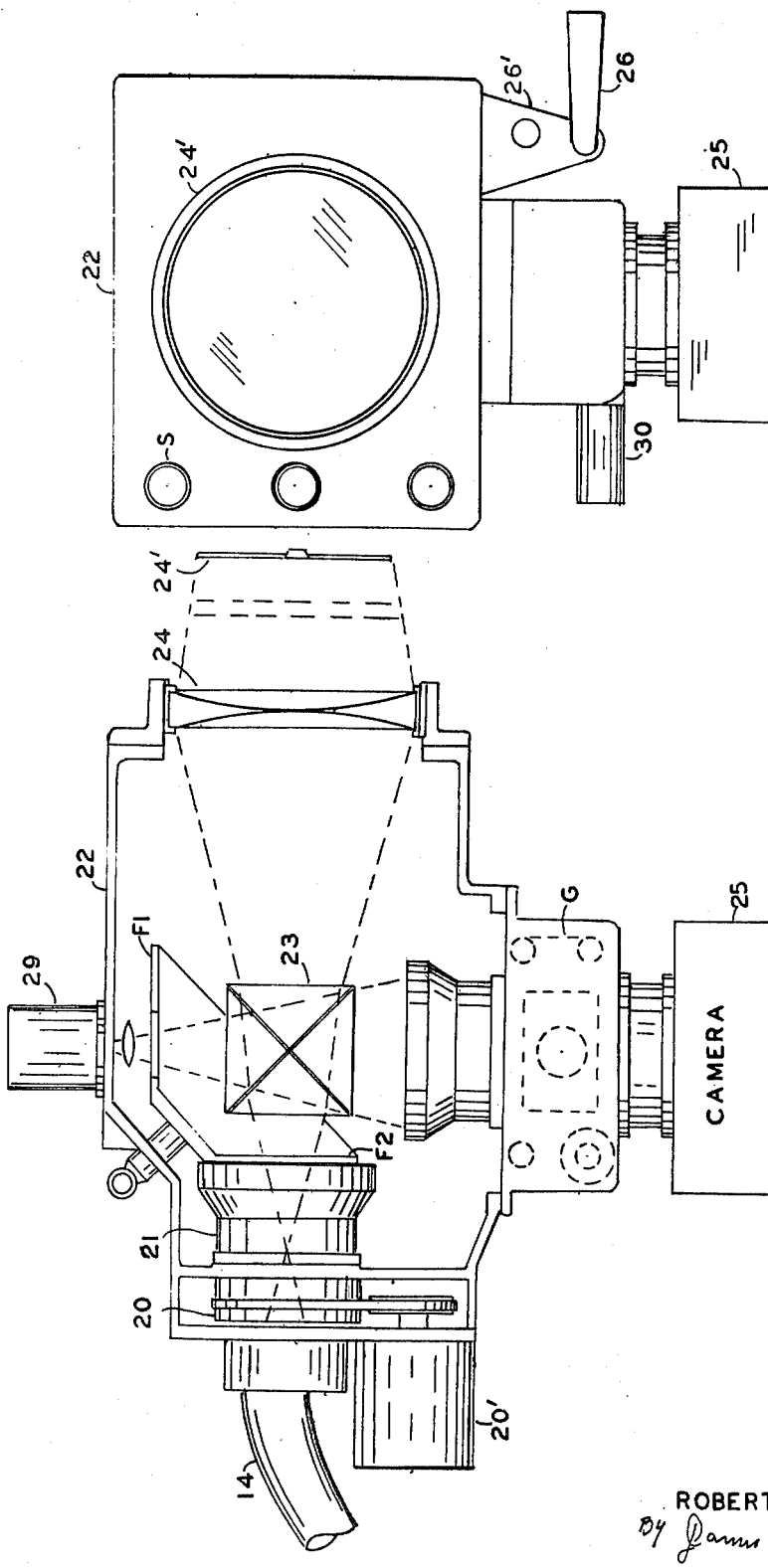

3,495,517
AIRBORNE VIEWFINDER MEANS WITH
FIBER OPTICS
Robert Sweet, Huntington, N.Y., assignor to
OPTOmechanisms, Inc., Plainview, N.Y.
Filed July 31, 1967, Ser. No. 657,330
Int. Cl. G03b *29/00, 3/00*
U.S. Cl. 95—12.5                         6 Claims

ABSTRACT OF THE DISCLOSURE

A viewfinder for taking aerial views has an objective lens system movably mounted on the bottom of an aircraft. The image is transmitted to a remote viewing apparatus by a flexible fiber optic cable where the operator may view it. Rotating synchronous optical scanners are positioned on each end of the long fiber optic cable to enhance the transmitted image. The viewing apparatus contains beam splitter to enable transmission of the image into a viewing screen and/or another camera or television pickup.

---

This invention relates to aerial viewfinders for aircraft.

The viewfinder is mounted on the bottom of the aircraft so it can look down or ahead at the terrain. A camera or other utilization apparatus may be either mechanically coupled to the viewfinder or connected thereto with an optical relay. In order for the operator to control the picture taking, it is necessary to transmit the image received to the control cabin to suitable viewing apparatus. The conventional way to do this is by system of fixed mirrors, prisms and relay lens assemblies.

The conventional type of optical relay system is very difficult to design, install, and adjust since every aircraft has different interior design. Therefore, in order to install the conventional type optical relays, it is quite necessary to change or compromise the design of the aircraft interior or the position of other components therein.

The present invention solves this problem by eliminating the conventional optical relays and substituting a flexible fiber optic cable transmission system. The image is transmitted to the viewing assembly where it is viewed by the operator. The image is split inside the viewing assembly, for instance, by a beam splitter so that the image may also be transmitted to a camera, or other apparatus.

The basic requirement of a viewfinder is to provide the pilot of the aircraft, through use of an optical system, a clear unobstructed view of the terrain along the proposed line of flight, and to assist as a navigation aid in maintaining a plotted flight line.

Most standard viewfinders consist of an optical train having objective lens or lenses, optical relay system and an eyepiece. The objective lens assembly is usually located on the underside of the craft to obtain an unobstructed view of the terrain. The eyepiece assembly is usually conveniently located on the observer's or pilot's instrument panel. A complex optical relay system is normally required to transfer the image from the remotely located objective lens to eyepiece assembly. These relay systems consist of an assortment of lenses, prisms and mirrors. Alignment of the optical relay components are critical and must be maintained throughout strenuous aircraft environmental conditions. This necessitates the design of massive, rigid, unwieldly structures. The design and installation of such a structure with the aircraft oftentimes proves to be extremely difficult, resulting in a compromise solution with many disadvantages. The rigid relay structure tends to obstruct the normal placement of other equipment. Removal and reinstallation for normal repair and maintenance of the system presents a tedious task. This is just to mention a few of the inconveniences caused by a rigid optical relay system.

A natural approach for eliminating many of these problems would be to design a flexible system. These flexible systems are difficult because the usual approach leads to a highly complex articulated optical train. Each required motion necessitates compensating motions along the entire optical relay train.

The present invention provides a solution to this problem by the utilization of a flexible optical relay system consisting of a coherent fiber optics cable with image enhancing means such as OPTOmechanisms, Inc. Image Enhancer.

ADVANTAGES OF FLEXIBLE OPTICS WITH IMAGE ENHANCER

The fiber optics image enhancer optical relay system concept makes practical separable modular design of optical viewfinder and sighting systems. The following advantages can be realized utilizing this new degree of freedom:

The object head and eyepiece assemblies can be designed as separate modules linked by a detachable optical relay cable.

Installation and removal of the entire system, or individual modules, is greatly facilitated.

Flexible optical relay cables can be manufactured in lengths from three to more than twelve feet, facilitating the adaption of the same optical sighting system design to a variety of aircraft, and on-board locations.

Flexible optical relay cables can be easily bent around existing equipment, thereby greatly facilitating modification of existing aircraft to encompass optical sighting system capabilities.

Objective lens head location virtually independent of eye-piece assembly orientation. With flexible relays other information may be relayed into the viewing means.

Only 2-inch diameter holes are required to install flexible optical relay cable runs.

High optical speed ($f/1$ or better) lenses can now be used as a result of being able to place the optical relay cable ends directly at the focal planes of objective and eyepiece lenses.

Panning of the objective lens head in the line of flight and even gimbaling is made possible, as a result of the flexibility of the optical cable system.

An appreciable weight saving over similar rigid optical systems can be realized.

Viewing system supporting structures are greatly simplified.

The system is considerably more reliable than equivalent rigid systems because there are no mirrors, prisms or lenses to go out of alignment in the optical relay train.

Accordingly a principal object of the invention is to provide new and improved airborne viewfinder means.

Another object of the invention is to provide new and improved aerial camera means.

Another object of the invention is to provide new and improved viewfinder means for aerial cameras utilizing fiber optics.

Another object of the invention is to provide new and improved aerial viewfinder means wherein the objective lens assembly is moveably mounted and adapted to be controlled from the operator's position and the fiber optic cable is sufficiently flexible to allow this movement.

Another object of the invention is to provide new and improved viewfinder means for an aircraft comprising an objective lens assembly moveably mounted at the bottom of said aircraft so as to view the ground below and ahead, a viewing assembly mounted in the cabin of said aircraft, flexible fiber optic cable means connecting said objective lens assembly and said viewing assembly.

These and other objects of the invention will be apparent by the following specification and drawings of which:

FIGURE 1 is an elevation view partly in section of the objective lens assembly.

FIGURE 2 is a section view taken along the lines 2—2 of FIGURE 1.

FIGURE 3 is an elevation view of the viewing assembly, with the side cover removed, and FIGURE 4 is a front view of the assembly.

Referring to the drawing, the objective lens assembly may comprise a wide angle lens 1 and a narrow angle lens 2 mounted on a turret 3, the turret being rotatably mounted in a support member 4 which is pivotally mounted to the fixed casing 5 by means of the pivots 6 and 7. The axis of the pivots 6 and 7 is perpendicular to the longitudinal axis of the aircraft so that the assembly may be pivoted as shown in FIGURE 1, in order to look ahead. The pivots 6 and 7 are mounted in a groove 8 in the casing and also connected by means of a slot 10 in a member 11, and corresponding members on the other side, which are pivotally mounted to the case so that the objective lens assembly may move between the two positions illustrated by the full and dotted lines in FIGURE 1. The lens assembly has a turret 3 which is rotated by means of a motor 12, the output of which is geared to the turret. The turret is used when it is desired to move from the wide angle lens to the narrow angle lens or vice versa. The coverage of the different lens and the pan angle are illustrated in FIGURE 1. The lens assembly is guided by rollers R1–R4 riding on guide 9.

The image is transmitted by means of the fiber optic cable 14 to the control location. At the input end of the cable is mounted an image enhancer 15 which may be of the type shown in commonly assigned Patents 3,217,- 589, 3,217,588, 3,110,762. The image enhancer device generally comprised a rotating prism or a wedge which is motor driven which is adapted to scan the image over the end of the fiber optical cable. A similar enhancer device 20 is mounted at the other end of the cable, see FIGURE 3. The enhancer devices are driven by motors 15' and 20' so that the image is returned to the normal position at the output of the cable.

A fiberscope cable ¾ inch square consists of more than a million glass rods of a diameter slightly larger than .0004 inch. Fiberscopes have been made up to a length of approximately 12 feet.

Light enters each fiber and is reflected within the rod; if the light rays enter at a low angle, not exceeding 30 degrees from the axis of the fiber. The light is then totally reflected like the total reflection in a prism. A glass jacket of low refractive index is provided around each fiber, to prevent leakage of light from one fiber to another. The glass cladding forces total reflection to occur within each fiber. It also protects the diffusion of light through the sides. Actual tests have demonstrated that 70% of the incident light enters the fibers, thereafter, attenuation is approximately 10% per foot. A six foot fiberscope will have a minimum transmission of 36% of the incident light.

Since each glass rod is extremely thin, it can be easily bent to a radius of 0.1 inch without breaking. However, the fiber bundle must be protected by sheathing it in a flexible armoured cable. The inflexibility of the sheathing cable actually controls the minimum bend radius. A standard 1½ inch armoured cable will have a minimum bend radius of four inches. The cables are similar in construction to the flexible hydraulic cables lines common to most aircraft.

There are two general categories of faults which occur in fiber optics system attributable to the matrix like structure of the individual fibers in the cable, to the fiber breakage characteristic, and to individual fiber size, namely:

(1) Limitation of resolution capability of the bundle, and (2) Poor general image quality due to fully broken (black) or partly broken (gray) multi-fibers, and to the "dirty screen door" effect caused by the matrix structure of the cable.

System resolution, for high quality results, should be in the order of 40 lines pairs/mm., which implies that the resolution of the fiberscope itself must be something higher than 40 line pairs/mm. However, it is to be emphasized that, even if the fiberscope were capable of meeting its necessary resolution requirements the picture quality would still be degraded due to the effects noted in (2), above.

The Image Enhancement device provides significant improvement in both major fault categories: i.e., increasing by a factor of 1 to 2 the resolution capability of the fiber optics bundle which, at best, in an enhance system is inherently limited by fiber size, and in removing those effects which are deleterious to the quality of the bundle.

The principle of operation of the image enhancer involves a synchronous optical scanning means which effectively time-shares each and every fiber within the bundle over the format normally covered by approximately 150 fibers located within a 1500–2000 fiber matrix. In visual systems, the scanning rate is chosen at approximately 30 c.p.s., which is higher than the flicker threshold of the human eye.

If the scanning rates at both ends of the cable are properly synchronized, the non-transmission characteristic of a broken fiber (indicated by a black spot) is averaged out over the scanned area. That is, the format point normally covered by the broken fiber is transmitted through several different individual fibers during the course of one scan cycle, and at a rate rapid enough to be unobservable. Light application through the Enhancer is 100%, so that there is no light attenuation attributable to the device, other than that encountered because of the interposition of a single glass element at each end of the cable. These elements will be coated to minimize reflection losses.

Motors are used to accomplish the optical scanning. Each of the cable ends is fitted with a motor, as shown in FIGURES 2 and 3. Each motor rotates the optical element necessary to perform the scanning. The success of the system depends upon the ability of the motors to maintain instantaneous positional correspondence with each other within close limits. Variations in motor speed are unimportant, so long as all motors exhibit close instantaneous speed characteristics.

The speed of a synchronous motor is determined by the number of poles and the electrical frequency supplied. All motors in each system will be supplied with power from the same aircraft-generated source so that frequency variations will affect all motors simultaneously. Under such operating conditions, the motor speed may vary, but the instantaneous speed of all motors will be the same within very close limits. As noted above, the servo, or angular tracing requirement will thus be met.

Scanning means other than motor driven may be used.

Referring to FIGURE 3 the images focused by lens 21 mounted in the viewer 22 on to a beam splitter 23 which splits the beam and transmits one component through the viewing screen lens 24 and transmits a second component to the camera 25. A third component may be focused onto other utilization apparatus such as a TV pickup 29. Lens 24 focuses the image on a viewing screen 24'. A plurality of filters F1, F2, etc. are rotatably mounted on a selector.

FIGURE 4 shows a front view of the viewer 22 and the viewing screen 24'. The viewer preferably includes controls for positioning the objective lens system which may be a control cable 26 operated by means of a knob 26' alternatively the lens system may be controlled by a servo motor, by hydraulic control or other conventional control means. A lens selector operates the lens turret motor.

The viewer may also include a grid G to facilitate making measurements and identification. The viewer may also include suitable lighting and illumination controls. The grid may be a motor 30 driven grid so that the measurements may be related to the speed of the aircraft.

The present invention is designed to provide the observer or pilot of the aircraft with a clear unobstructed view of the terrain along the proposed line of flight, and to assist as a navigation aid in maintaining a plotted flight line.

Through the use of fiber-optics bundle, and associated lenses, an image will be placed on the presenttion field lens of the viewfinder console located in the observer's or pilot's compartment. A turret lens arrangement is provided to handle two more lenses if so desired. The illustrated design shows only two such lenses allowing for fields of views; 60° wide angle, 30° narrow. Resolution at the viewing station will be at least 40 lines/mm. Resolution at the viewing station will be tailored to meet the resolution of the human eye or camera. The presentation console will preferably contain appropriate bright line drift reticles, automatic or manual traveling grid, variable optical filter system, variable reticle illumination, presentation field lens of high optical quality, a five inch viewing aperture and a 4½ inch diameter exit pupil, 25 inches removed from the presentation field lens.

The field to be observed has a 5-inch round format. Two manually selected lenses provide 60±3 degrees and 30±3 degrees fields of views. The objective lenses each can be positioned to a predetermined line of sight with respect to the aircraft line of sight attitude.

Brightness over the entire 60 or 30 degrees will be very closely uniform. The excellent field brightness uniformity characteristic of the proposed system, as compared to a "straight optical" system, is one major advantage available with the fiber optics approach.

On-axis transmission through the system is approximately 20%. When considering use of a 6 foot long fiber cable, vignetting for the system is small, except for a slight (perhaps 10–15%) decrease of uniformity at the very edge of the field.

System minification may be: 6:1 for the wide angle field of 60 degrees, 3:1 for the narrow angle field of 30 degrees.

The image will be presented to the eye with a resolution of approximately 9 line pairs/mm. This is at least as good as the average resolving power of the eye, when the observer's eye is located at 20 inches from the eye lens.

In one embodiment the objective lens assembly contains a lens turret allowing for a plurality of interchangeable lenses. The turret is driven by a 400 c.p.s. gearhead motor, and will rotate into position in approximately 2 seconds. An instantaneous ON switch, activated by the lens selector lever, starts to drive the turret out of its detent. When the turret micro-switch is out of the detent the motor drives until the adjacent positive acting detent cuts the power to stop the turret. The lens selector lever is also connected to the objective head pan drive via a flexible wire cable. This allows the operator to position the lens on one of two sighting positions. If required, the operator could pan the objectives in the line of flight by placing the lens selection lever to an intermedial position. This lever may also be designed for electric motor or hydraulic actuation. The selection of turret and angle of view can either be achieved by a motorized drive, or hand operated linkage.

The eyepiece assembly accepts the fiberscope end containing the image information. The image is transferred and enlarged six times so as to fill the eye lens. The eye lens is a field lens and forms the 4½ inch exit pupil 25 inches from its vertex. The lower lens and beam splitter assembly projects a bright line drift and traveling grid reticle. A variable light source controls the bright line reticle illumination. A 400 c.p.s. motor tachometer drives the traveling grid. The traveling grid may be operated either manually via a precision divider or by output signals from the photographer's V/H console.

Many modifications may be made by those who desire to practice the invention without departing from the scope thereby which is defined by the following claims.

I claim:
1. Viewfinder means for an aircraft comprising,
    an objective lens assembly moveably mounted at the bottom of said aircraft so as to view the ground below and ahead,
    a viewing assembly mounted in the cabin of said aircraft,
    flexible fiber optic cable means connecting said objective lens assembly and said viewing assembly, said flexible fiber optic cable means including image enhancement means of the type having rotating optical deviation means at each end of said cable.

2. Apparatus as in claim 1 having a camera, a beam splitter mounted in said viewing assembly and viewing screen mounted on said viewing assembly, said beam splitter being adapted to split the image so that the image may be projected on the viewing screen and also transmitted to said camera and means to transmit said image to said camera.

3. Apparatus as in claim 2 wherein said objective lens assembly has means to move said objective lens said moving means being controlled by the operator at said viewing screen.

4. Apparatus as in claim 3 wherein said fiber optic cable means includes image enhancement means.

5. Apparatus as in claim 1 wherein said viewing assembly includes means to transmit the view to other utilization apparatus.

6. Apparatus as in claim 1 wherein said viewing assembly includes means to receive more than one information display.

References Cited

UNITED STATES PATENTS

| | | | |
|---|---|---|---|
| 2,832,274 | 4/1958 | Lorenz | 95—45 |
| 2,862,430 | 12/1958 | Clift | 95—45 |
| 3,068,772 | 12/1962 | MacNeille | 95—44 |
| 3,253,524 | 5/1966 | Ashizawa | 350—96 |
| 3,300,777 | 1/1967 | Tarr | 95—12.5 |

NORTON ANSHER, Primary Examiner

L. H. McCORMICK, Jr., Assistant Examiner

U.S. Cl. X. R.

95—44; 240—1; 350—96, 301